UNITED STATES PATENT OFFICE.

ADÈLE BOSSÉ, OF PARIS, FRANCE.

COSMETIC.

SPECIFICATION forming part of Letters Patent No. 439,101, dated October 28, 1890.

Application filed September 30, 1889. Serial No. 325,618. (No specimens.)

*To all whom it may concern:*

Be it known that I, ADÈLE BOSSÉ, a citizen of the French Republic, residing at Paris, France, have invented a new and useful Composition Containing Mucilage of Linseed Suitable for Cosmetics, &c., of which the following is a full, clear, and exact description.

The object of my invention is a new emollient product, principally used for perfumery. The mucilage of linseed is preferably obtained by a cold process. I take about five kilograms of linseed, which is carefully washed in an abundant quantity of water, so as to free it from all impurities which it may contain. It is then soaked for about forty-eight hours in about ten liters of distilled water, which is from time to time vigorously agitated by means of a stirrer. I then strain this through a piece of muslin or light linen and obtain therefrom, by means of squeezing, about five liters of an opaque and translucent matter, which constitutes the mucus or mucilage of linseed, and which can be used single or mixed with other products for toilet preparations. The product may also be obtained by a hot process, and in this case the prior soaking of the seed is not necessary. The new product obtained in this manner can be used for perfumeries, for the manufacture of powders, soaps, or toilet-waters. I will for a better illustration indicate some of these applications.

For making toilet-powder with mucilage of linseed I add to the mucilage, which I have obtained in the above-described manner, about a double quantity of pure rice starch in pieces and in powder. It is then crushed by the hand and by a roller before it is dried in the air. Subsequently it is pulverized, bolted, and aromatized, and an excellent toilet-powder is obtained. The same extract or mucilage of linseed can also be used after boiling. For this purpose it is boiled an hour. A little water is added if the matter should become too thick. It is skimmed and pressed in muslin. In this manner I obtain a boiled mucilage, which can be compounded with several other products in the proportion from twenty to thirty per cent., as the case may be. For making soap, for instance, I add the mucilage to the soapy paste either at the moment of the boiling of the same in the boiler or of the casting in the frame-molds, or it is added to the soap when in chips. I obtain in this manner an excellent toilet-soap and also a valuable soap for washing linen clothes for children, and for cleaning and scouring stockings, flannel, and woolen goods. The same mucilage is also advantageously applied in shaving-soap, powders, in all kinds of paste to make the hands white, and also in a small sponge or rag, which is used to cure the meconium of new-born babies, and for all similar purposes.

If added in the largest proportion to the paste of soap, the mucilage will yield an excellent preparation for a bath, composed as follows: pulverized soap, fresh bran, and mucilage of linseed. Added to a soap bath containing extract of bran it yields an essentially hygienic bath, possessing all qualities and all elements contained in the bran and the linseed.

The mucilage can also be used in the preparation of a kind of milk, and which is a specimen of toilet-water, which is readily known by its gluey and slimy appearance and by its whitish color, and which I prepare as follows: I take five liters of mucilage prepared by the hot process, wherein I dissolve one hundred grams of spermaceti and one hundred grams of virgin-wax. This mixture is carefully stirred until it is completely cooled, and is then colored white with an extract of sweet almonds, which are added in a quantity of six-twentieths and finally aromatized with essence or extracts of different flowers.

I reserve of course the right to modify the proportions of the several substances used for my perfumery preparations with a basis of mucilage of linseed.

Having fully described my invention, what I claim as new, and desire to secure by Letters Patent, is—

1. The herein-described composition for cosmetics, &c., consisting of mucilage of linseed, spermaceti, and wax combined, substantially as and in the proportions specified.

2. The herein-described composition for cosmetics, &c., consisting of mucilage of linseed, spermaceti, wax, and the extract of almonds, substantially as and in the proportions specified.

In witness whereof I have hereunto set my hand in presence of two witnesses.

ADÈLE BOSSÉ.

Witnesses:
 JULES FAYOLLER,
 CHARLES NABLET.